United States Patent
Cartier Millon et al.

(10) Patent No.: US 8,471,423 B2
(45) Date of Patent: Jun. 25, 2013

(54) TRANSVERSE FLUX ROTARY MACHINE AND SWITCHING DEVICE EQUIPPED WITH SUCH A MACHINE

(75) Inventors: Christophe Cartier Millon, Bresson (FR); Benoit Froidurot, Goncelin (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 266 days.

(21) Appl. No.: 12/989,793

(22) PCT Filed: Apr. 9, 2009

(86) PCT No.: PCT/FR2009/000415
§ 371 (c)(1),
(2), (4) Date: Oct. 27, 2010

(87) PCT Pub. No.: WO2009/133295
PCT Pub. Date: Nov. 5, 2009

(65) Prior Publication Data
US 2011/0043064 A1     Feb. 24, 2011

(30) Foreign Application Priority Data
Apr. 28, 2008   (FR) ...................................... 08 02379

(51) Int. Cl.
*H02K 1/06*     (2006.01)
(52) U.S. Cl.
USPC ........................ 310/156.02; 310/263; 310/257
(58) Field of Classification Search
USPC ............. 310/156.02–156.08, 156.66, 156.71, 310/257, 263
See application file for complete search history.

(56) References Cited

U.S. PATENT DOCUMENTS

| 6,492,758 | B1 | 12/2002 | Gianni et al. |
| 2002/0171315 | A1* | 11/2002 | Kastinger ...................... 310/254 |
| 2005/0062352 | A1* | 3/2005 | Kastinger ................ 310/156.02 |
| 2007/0267929 | A1* | 11/2007 | Pulnikov et al. ......... 310/156.02 |
| 2008/0246362 | A1* | 10/2008 | Hirzel ....................... 310/156.02 |

FOREIGN PATENT DOCUMENTS

| DE | 10 2006 022836 | 11/2007 |
| WO | 02 09261 | 1/2002 |

OTHER PUBLICATIONS

International Search Report issued Jan. 29, 2010 in PCT/FR09/000415 filed Apr. 9, 2009.

* cited by examiner

*Primary Examiner* — Tran Nguyen
*Assistant Examiner* — Naishadh Desai
(74) *Attorney, Agent, or Firm* — Oblon, Spivak, McClelland, Maier & Neustadt, L.L.P.

(57) ABSTRACT

A rotary machine including two coaxial parts, the first part including an intermediate part, an energizing coil, and fingers distributed around the circumference of the intermediate part with a constant finger pitch and directed alternately in opposite directions. The fingers are positioned so as to interlace over part of the coil. The second part includes a permanent magnet and two lateral parts mounted substantially coaxially, the lateral parts being secured to the permanent magnetic part so as to have opposite polarities, the lateral parts including protrusions distributed around the circumference of the lateral parts and arranged in alternation on one and the other of the lateral parts with a protrusion pitch substantially equal to the finger pitch. A control device can be equipped with such a rotary machine.

19 Claims, 19 Drawing Sheets

TRANSVERSE FLUX ROTARY MACHINE AND SWITCHING DEVICE EQUIPPED WITH SUCH A MACHINE

TECHNICAL FIELD OF THE INVENTION

The invention relates to the field of transverse flux rotary machines that can be used as motors or generators.

The invention concerns, in particular, a transverse flux rotary machine comprising two main parts mounted substantially coaxially about a main axis, said main parts consisting essentially of a stator and a rotor rotatably mounted relative to the stator, the first main part comprising at least one energization coil, a magnetically permeable intermediate part and fingers arranged along the circumference of said intermediate part at a constant finger pitch and alternately oriented in opposite directions, said fingers forming a first air gap surface, said fingers being disposed so as to interlace over a portion of said coil and to form with said intermediate part a plurality of magnetic circuits, the second main part comprising an axially polarized permanent magnetization portion and a second air gap surface for closing the magnetic circuits formed in the first main part.

PRIOR ART

German patent application DE 10 2006 022 836 describes a transverse flux rotary machine including a stator and a rotor mounted coaxially and having poles in the form of fingers. The poles of the rotor are interconnected to form an annular rotor body enclosing a magnet polarized in the axial direction.

A technical problem of the transverse flux machine described hereinabove is that the variations in time of the magnetic flux in each pole are not optimized.

STATEMENT OF THE INVENTION

The invention aims to remedy technical problems of the prior art transverse flux machines by proposing a transverse flux rotary machine comprising two main parts mounted substantially coaxially about a main axis, said main parts consisting essentially of a stator and a rotor rotatably mounted relative to the stator, the first main part comprising at least one energization coil, a magnetically permeable intermediate part and fingers arranged along the circumference of said intermediate part at a constant finger pitch and alternately oriented in opposite directions, said fingers forming a first air gap surface, said fingers being disposed to form with said intermediate part a plurality of magnetic circuits around a portion of said coil, the second main part comprising a second air gap surface for closing said magnetic circuits formed in the first main part by the intervention of the first air gap surface, and a permanent magnetization portion that is unidirectionally polarized.

The invention is characterized in that said fingers are disposed to interlace, the second main part including protuberances carrying the second air gap surface, said protuberances being fastened to said permanent magnetization portion so as to have opposite polarities, said opposite polarity protuberances being alternately arranged along the circumference of said second main part with a protuberance pitch substantially identical to the finger pitch.

The first main part is preferably a stator and the second main part is preferably a rotor.

In one embodiment of the invention the intermediate part has a cylindrical portion. In this case the fingers oriented in a given direction may be fastened to an annular part disposed on an edge of the cylindrical portion of the intermediate part. The fingers fastened to the same annular part are preferably inside the cylindrical part. Alternatively, the fingers fastened to the same annular part are outside the cylindrical portion.

In one embodiment of the invention the permanent magnetization part is in one piece. The permanent magnetization part is advantageously cylindrical.

In one embodiment of the invention the second main part includes two magnetically permeable lateral parts mounted substantially coaxially relative to the main axis, said lateral parts being fastened to the permanent magnetization part so as to have opposite polarities, the protuberances of the same polarity being disposed on one or the other of the lateral parts and arranged along the circumference of said lateral parts. The lateral parts may be annular parts disposed on the circumference or on the edges of the permanent magnetization portion.

In one embodiment of the invention the protuberances are teeth the end faces of which form the second air gap surface. Alternatively the protuberances are L-shaped with the end branches oriented axially.

In one embodiment of the invention the first main part is disposed around the second main part. Alternatively the second main part is disposed around the first main part.

The invention also provides a switching device including a control member and a rotary machine used as an energy generator, said rotary machine including a rotor, the device being characterized in that the rotary machine is a machine as described above, the rotor being mechanically coupled to the control member.

BRIEF DESCRIPTION OF THE FIGURES

Other advantages and features will emerge more clearly from the following description of particular embodiments of the invention given by way of nonlimiting example and represented in the appended figures.

DETAILED DESCRIPTION OF ONE EMBODIMENT

Figure 1:
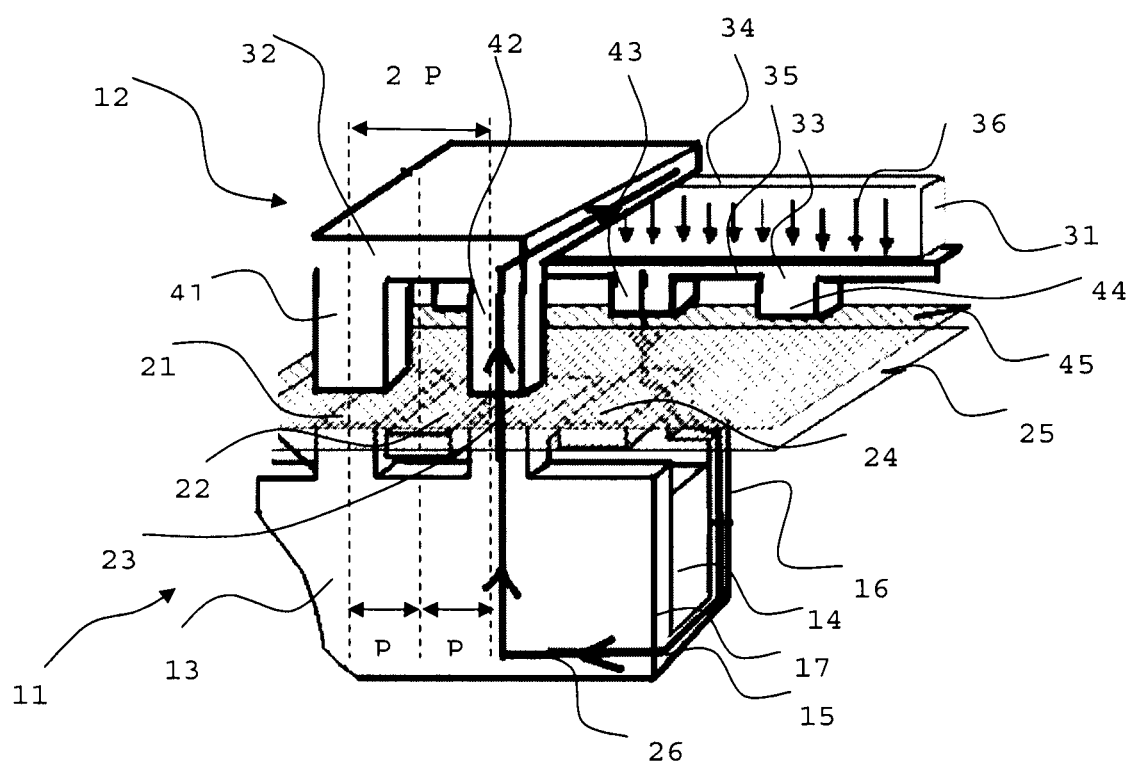
FIG. 1 is a diagrammatic representation of a portion of a rotary machine of the invention in which the curvatures of the circular parts are represented as if straightened out.

Referring to the illustrative example represented in FIG. 1, the transverse flux rotary machine includes a first main part 11 and a second main part 12, each of which parts can be either the stator or the rotor. These main parts are mounted coaxially relative to a main axis that is not visible in FIG. 1. These main parts are partially represented to describe better the operation of the rotary machine. For clarity, the curvatures of these two main parts have been represented as if straightened out. Thus the horizontal lines in FIG. 1 in reality represent a curvature along the circumference of the two main parts. In this FIG. 1 representation, this circumference is defined relative to a main axis crossing the plane of said figure at a point situated below said figure. In other words, the main parts are represented in FIG. 1 as if they had an infinite radius of curvature defined relative to a main axis passing through the plane of FIG. 1 at a point situated below said figure.

The first main part 11 partially represented in figure includes a ferromagnetic material intermediate part 13 and an energization coil 14. The intermediate part 13 has a cylindrical portion 15 and edges 16, 17. The coil 14 is wound around the circumference of the cylindrical part. Note that this circumference of the cylindrical part is represented in FIG. 1 as if straightened out, along a horizontal line. The first main part 11 from FIG. 1 further includes ferromagnetic material fingers 21-24 arranged along the circumference of the intermediate part 13 with a constant finger pitch P. These fingers are alternately oriented in opposite axial directions. Thus the fingers 21 and 23 are oriented in the opposite direction to the fingers 22 and 24. These fingers are disposed so that they interlace over a portion of the energization coil 14. In the case represented in FIG. 1, the fingers are arranged along the circumference of the edges 16, of the intermediate part 13 and are disposed alternately on one and the other of said edges with a constant finger pitch P. The fingers 21-24 are L-shaped and disposed to form a first air gap surface 25. To be more precise, the air gap surface 25 is formed by an external axial flank of the fingers 21-24. The fingers are disposed so as to form with the intermediate part a plurality of magnetic circuits. One of these magnetic circuits is represented by a line 26. In the first main part 11, the magnetic circuit 26 passes successively through the finger 24, the edge 16 of the intermediate part 13, the cylindrical part 15 of said intermediate part, the edge 17 of said intermediate part, and the finger 23. This magnetic circuit 26 in the first main part is thus an open circuit. This circuit is closed by interposing the second main part 12 in which it extends (see below).

The second main part 12 partially represented in FIG. 1 includes a permanent magnetization portion 31 that is unipolar or unidirectionally polarized and two ferromagnetic material lateral parts 32, 33 mounted substantially coaxially. In the case represented, the permanent magnetization portion 31 is polarized radially. A unidirectionally polarized magnetization portion generally has two poles on two opposite faces. A permanent magnetization portion of this kind may sometimes be referred to as a unipolar magnetization portion. As for the first main part, the permanent magnetization portion 31 and the two lateral parts 32, 33 have curvatures at the circumference represented by a horizontal line. The lateral parts are fastened to the permanent magnetization portion so as to have polarities of opposite sign. The permanent magnetization portion 31 has two faces 34, 35 having magnetizations of opposite sign represented by the arrows 36. These two faces 34, 35 therefore constitute the poles of the magnetized portion. To obtain polarities of opposite sign on the lateral parts, the latter parts are fastened to each pole 34, 35 of the permanent magnetization portion 31. The lateral parts 32, 33 include protruberances or teeth 41-44 the end faces of which form a second air gap surface 45. These protruberances are arranged along the circumference of the lateral parts and disposed alternately on one and the other of said lateral parts with a protruberance pitch substantially equal to the finger pitch P. In the case represented in FIG. 1, the protruberances are oriented in a radial direction. The second air gap surface 45 formed by the end faces of the protruberances 41-44 and the first air gap surface 25 formed by the external flanks of the fingers 21-24 take the form of coaxial cylinders. These air gap surfaces 25, 45 define a substantially constant air gap distance between the two main parts. The magnetic circuit 26 in the second main part 12 is extended via the protruberances 42 of the lateral part 32, the permanent magnetization portion 31 and the protruberance 43 of the lateral part 33.

In other words, the fingers 21-24 cross so that each finger is facing a protruberance 41-44 on each rotation corresponding to one pole pitch, i.e. each rotation corresponding to the finger pitch, if the rotor is the first main part, or to each rotation corresponding to a protruberance pitch when the rotor is the second main part. The alternation of the polarities of the protruberances makes it possible to reverse the magnetic flux in each magnetic circuit for each pole pitch. Accordingly, the disposition of the fingers and the protruberances on the main parts 11, 12, notably the crossing of the fingers 21-24, makes it possible to reverse the magnetic flux on each rotation corresponding to a pole pitch. If the transverse flux rotary machine is used as a generator, the quantity of electrical energy generated in this way is therefore increased.

When current flows in the energization coil 14, a magnetic flux is generated in each of the magnetic circuits by the first main part. The protuberances 41-44 magnetically polarized by the permanent magnetization portion 31 of the second main part 12 are therefore attracted or repelled relative to the fingers 21-24 of the first main part 11. For example, in the case of the magnetic circuit 26 represented in FIG. 1, the protruberances 42, 43 of the second main part 12 and the fingers 23, 24 of the first main part 11 are mutually attracted. If the direction of the energization current in the coil 14 is reversed, the protruberances 42, 43 of the second main part 12 and the fingers 23, 24 of the first main part 11 are mutually repelled. In this way, by successively reversing the direction of the current in the energization coil, the main part of the rotary machine constituting the rotor is driven in rotation relative to the other main part constituting the stator.

Figure 2:
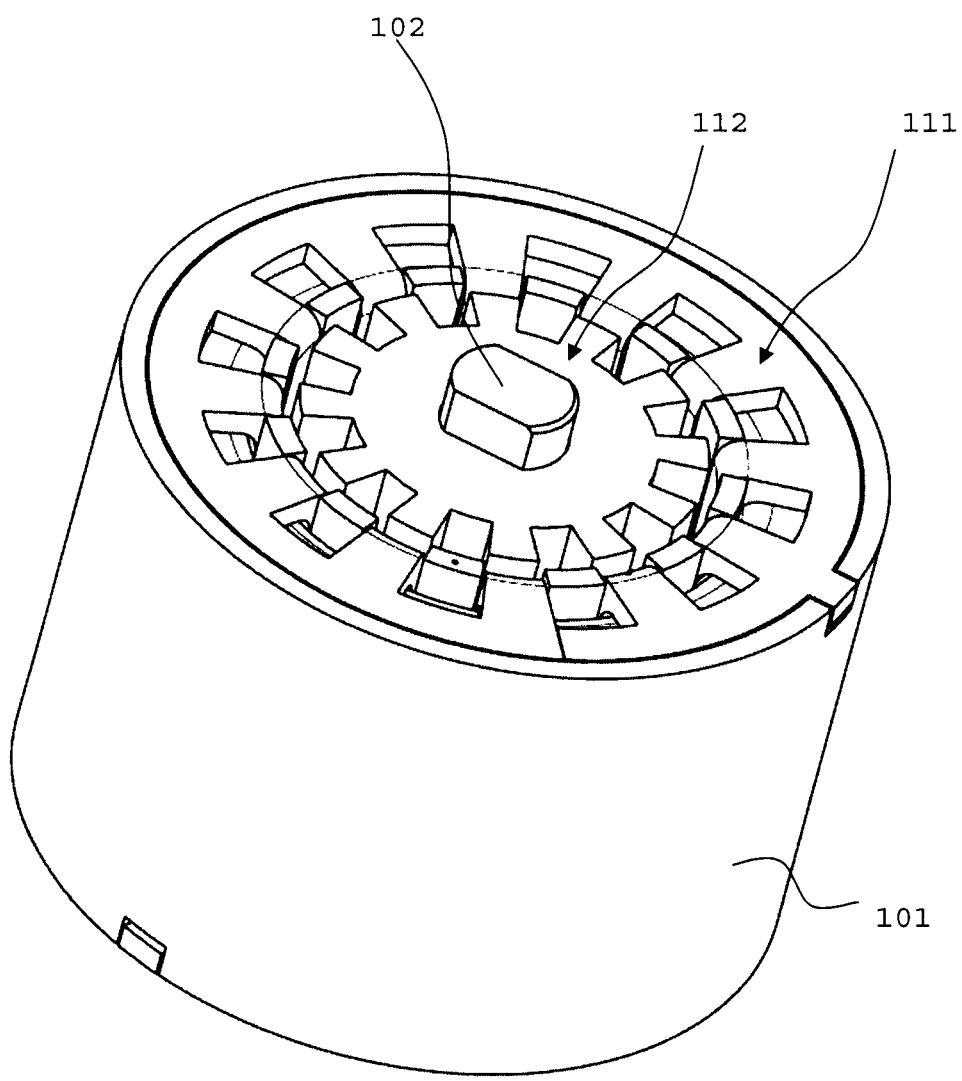
FIG. 2 is a perspective view of a rotary machine of a first embodiment of the invention.

In the first embodiment represented in FIGS. 2 to 7, the first main part 111 is static and thus constitutes the stator and the second main part 112 is mobile and thus constitutes the rotor. In this first embodiment, the stator 111 is disposed around the rotor 112. As can be seen in FIG. 2, the stator 111 includes a cylindrical envelope 101. The stator 111 and the rotor 112 are mounted coaxially with a main axis represented by the drive shaft 102 of the rotor.

Figure 3:
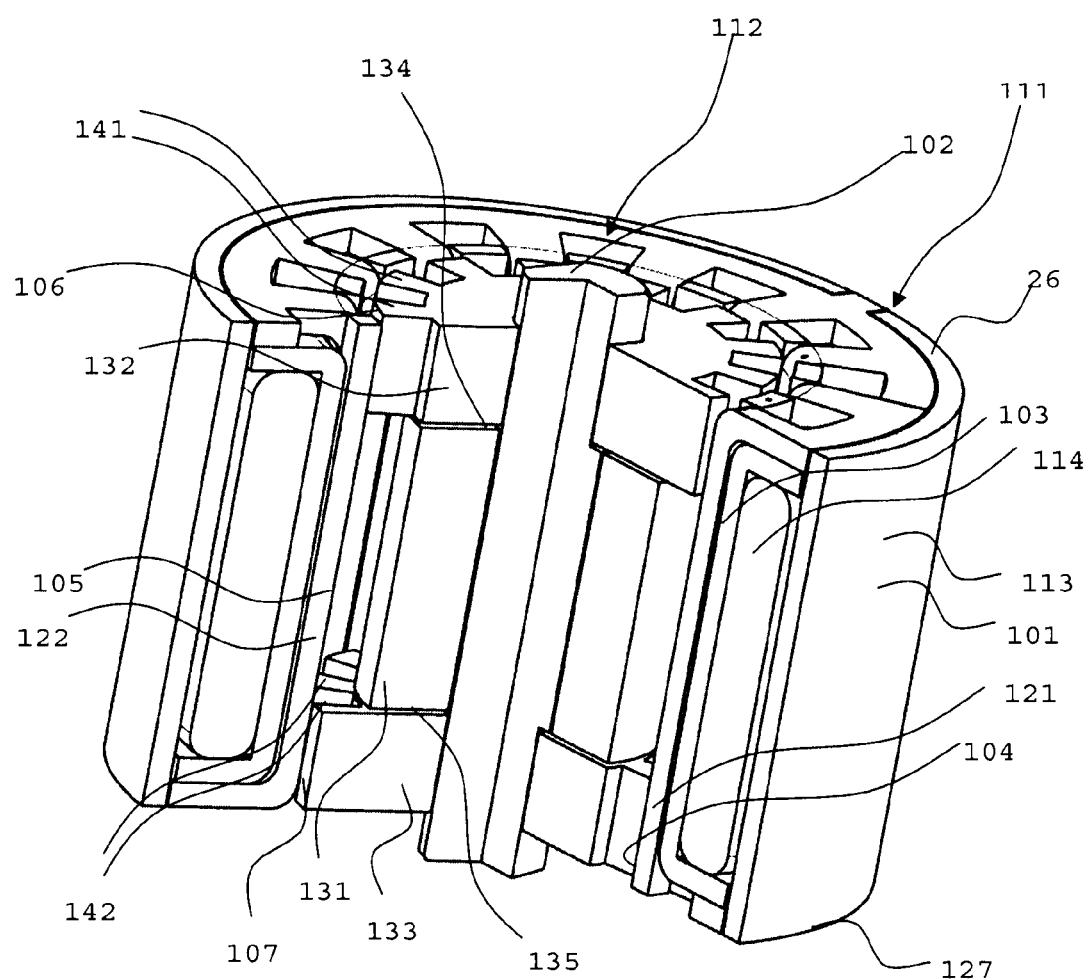
FIG. 3 is a partial perspective view of the embodiment represented in FIG. 2.
Figure 4:
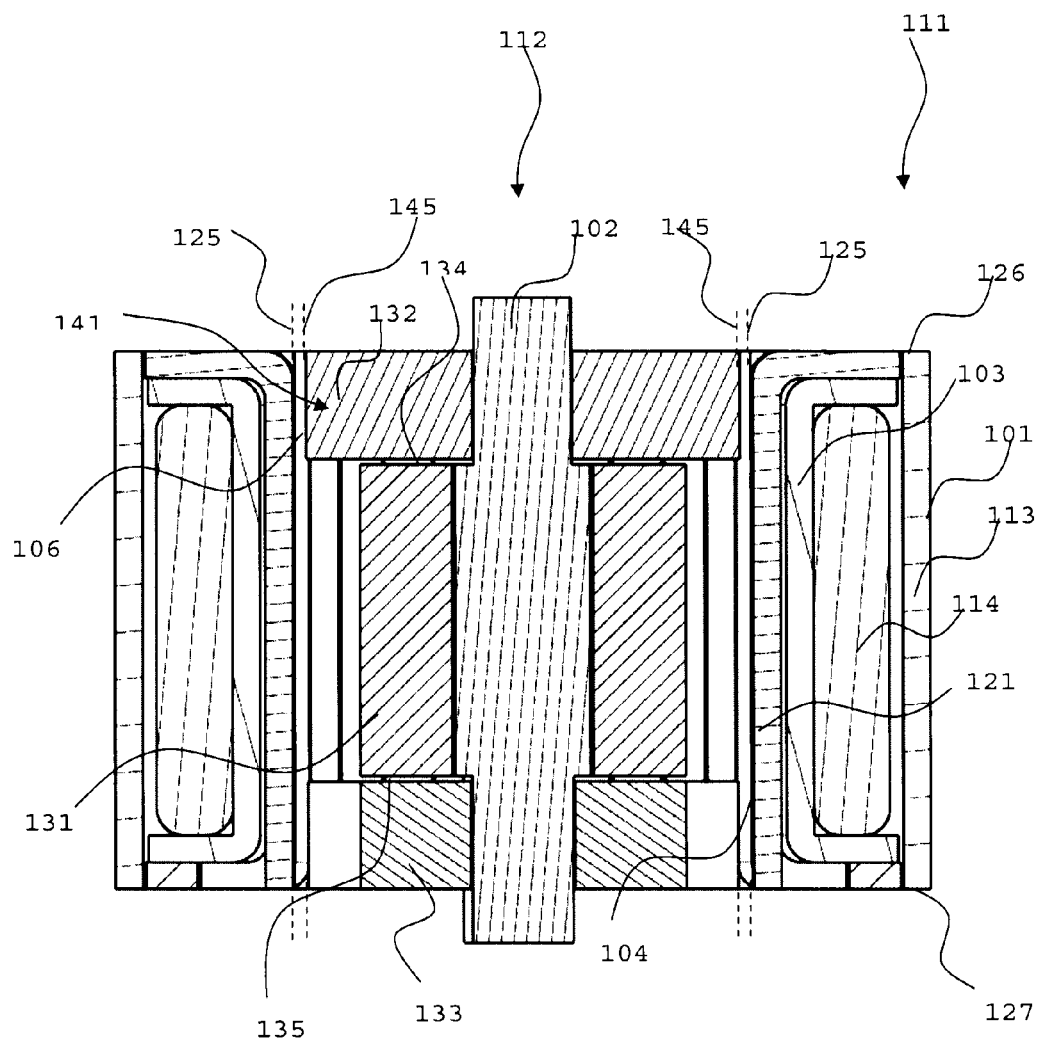
FIG. 4 is a view in section of the embodiment represented in FIG. 2.
Figure 5:
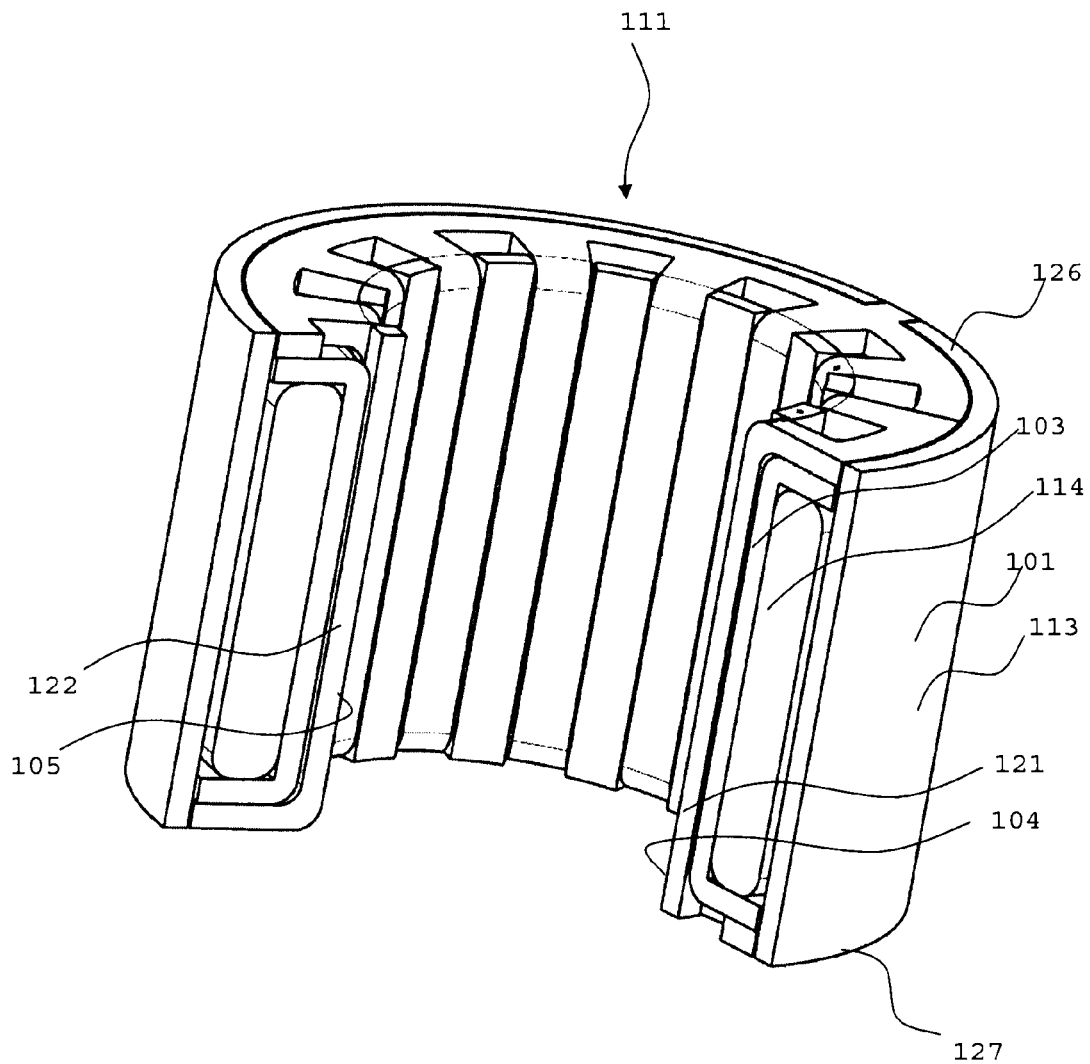
FIG. 5 is a partial perspective view of the stator of the embodiment represented in FIG. 2.

As can be seen in FIGS. 3, 4 and 5, the stator 111 includes a ferromagnetic material intermediate part 113 that is essentially formed by the cylindrical envelope 101. The stator 111 also includes an energization coil 114 mounted on a coil support 103. The stator 111 further comprises ferromagnetic material fingers 121, 122 arranged along the circumference of the intermediate part 113 so that they interlace over a portion of the energization coil 114. To be more precise, the fingers 121, 122 are distributed along the circumference of the annular parts 161, 162, respectively. These annular parts 161, 162 are fastened to the interior circumference of the intermediate part near the upper edge 126 and the lower edge 127 of the intermediate part 113, respectively. The fingers 121, 122 are disposed alternately along the circumference of each of the annular parts with a constant finger pitch and are oriented alternately in an opposite axial direction. Thus the fingers 121 distributed along the circumference in the vicinity of the upper edge 126 are downwardly oriented while the fingers 122 distributed along the circumference near the lower edge 127 are upwardly oriented. In this first embodiment, the fingers 121, 122 are L-shaped. A first air gap surface 125 of the stator 111 has a substantially cylindrical shape formed by the external axial flank 104, 105 of the fingers 121, 122.

The rotor 112 shown in FIGS. 3 and 4 includes a unidirectionally polarized permanent magnet 131 and an upper lateral part 132 and a lower lateral part 133 mounted substantially coaxially with respect to the drive shaft 102 of the rotor. The permanent magnet 131 has symmetry of revolution relative to the drive shaft 102 and is fixedly mounted around that shaft. To be more precise, the permanent magnet 131 has a cylindrical shape and has two faces 134, 135 having magnetizations of opposite sign and constituting the poles of said magnets. In the case represented, the permanent magnetization part 131 is polarized axially. For their part, the two lateral parts 132, 133 are made from a ferromagnetic material. The two lateral parts 132, 133 are fastened to the faces 134, 135 of the magnet. The magnetically permeable lateral parts 132, 133 therefore have polarities of opposite sign. The lateral parts 132, 133 also have symmetry of revolution relative to the drive shaft 102. The protruberances or teeth 141, 142 are arranged along the circumference of the lateral parts and disposed alternately on each of said lateral parts with a protruberance pitch substantially identical to the finger pitch. The end faces 106, 107 of the protruberances 141, 142 form a second air gap surface 145. The end faces 106, 107 and the faces of the external axial flanks 104, 105 forming the air gap surfaces can be plane. They can advantageously be slightly curved with a curvature along the circumference of the stator and the rotor in order to minimize variation of the air gap distance.

Figure 6:
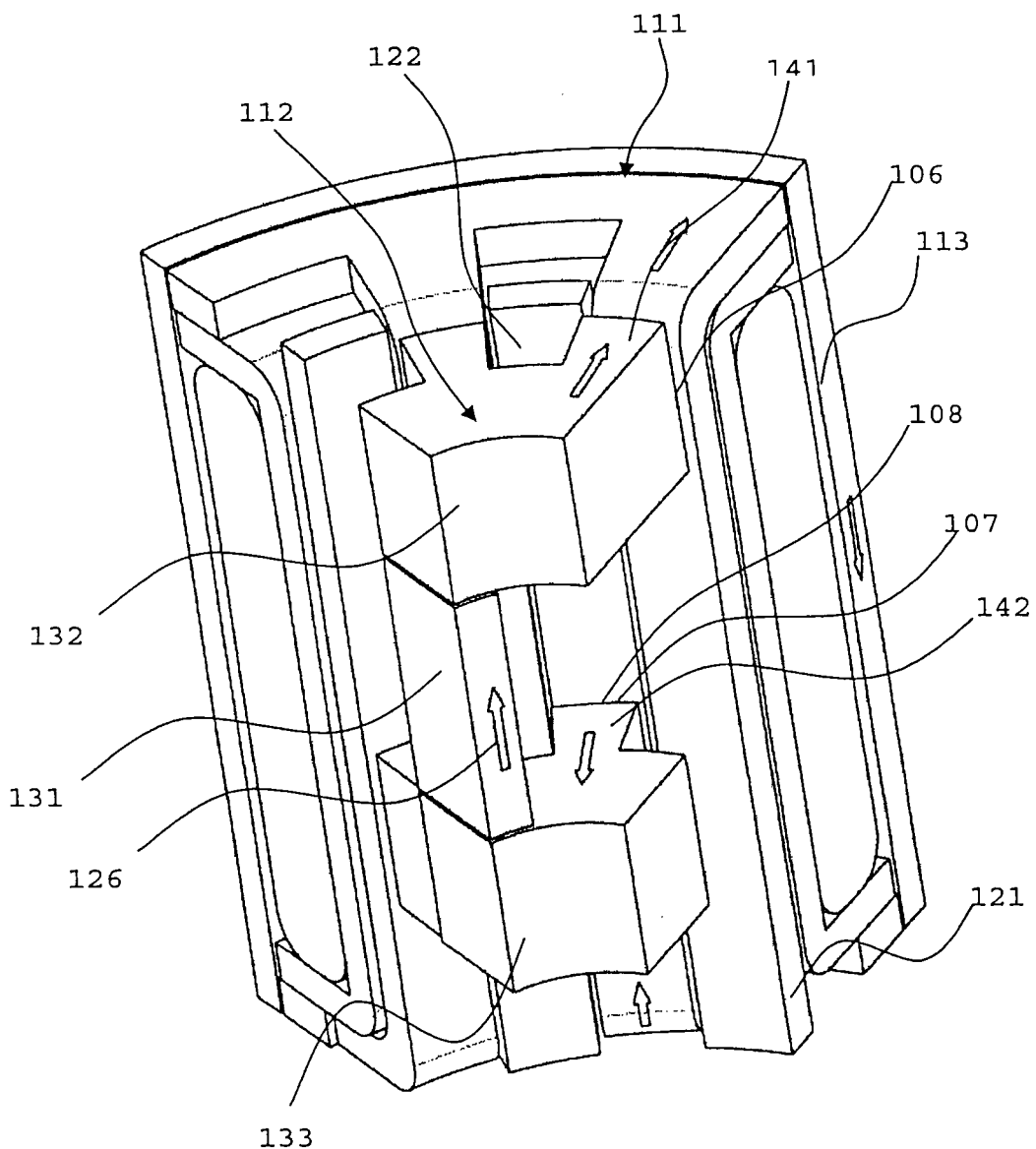
FIG. 6 is a perspective view of a magnetic circuit of the embodiment represented in FIG. 2.

As can be seen in FIG. 6, the fingers 121, 122 of the stator 111 are disposed so that they form with the intermediate part 113 a plurality of magnetic circuits. The magnetic circuit represented by the line 126 passes successively through the finger 121, the intermediate part 113, the finger 122, a first air gap 108, the protruberance 142 of the lateral part 133, the permanent magnet 131 and the protruberance 141 of the lateral part 132.

Figure 7:
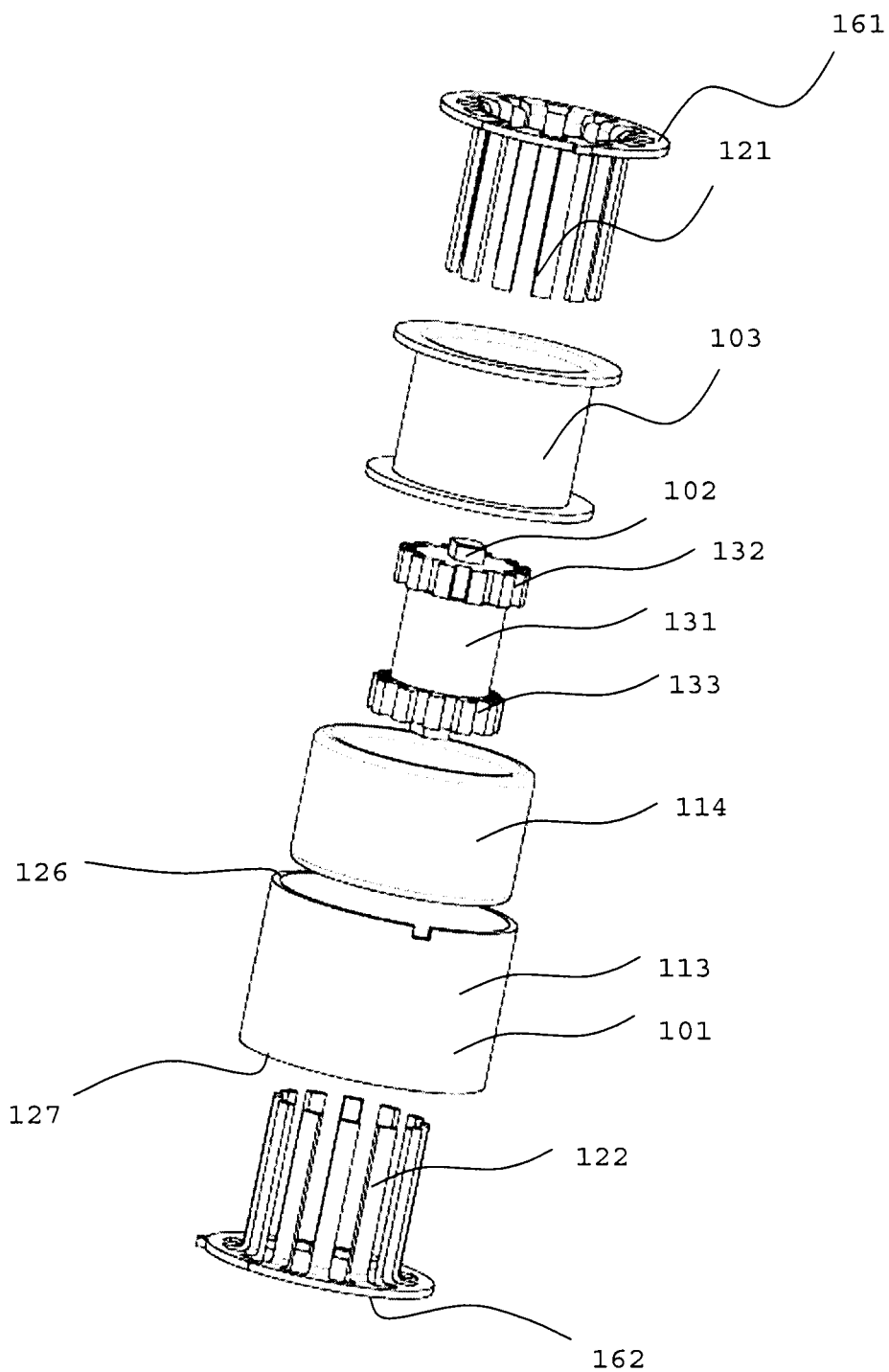
FIG. 7 is an exploded view showing the assembly of the embodiment represented in FIG. 2.

As can be seen in FIG. 7, the intermediate part 113 of the stator 111 has a hollow cylindrical portion that is essentially formed by the envelope 101 of said stator. The downwardly oriented fingers 121 are fastened to the annular part 161 and the upwardly oriented fingers 122 are fastened to the other annular part 162. When assembling a rotary machine of the first embodiment, the finger support annular parts 161, 162 come to bear on the edges 126, 127 of the intermediate part 113. This type of arrangement in which the fingers oriented in the same direction are fastened to the same annular part facilitates assembly of the rotary machine. In this first embodiment, the fingers 121, 122 fastened to the same annular part 161, 162 are inside the cylindrical portion of the intermediate part 113. When assembling the rotary machine, the energization coil 114 and the coil support 103 are thus inserted between the fingers 121, 122 and the intermediate part 113 to form the stator 111. The rotor 112 equipped with the magnet 131, the lateral portions 132, 133 and the drive shaft 102 is then inserted into the stator 111 and mounted coaxially relative to it.

The device of this first embodiment is compact and efficient. Totally reversible, it may be used as a motor, such as a windshield wiper motor, or as an energy generator for an autonomous device, such as a rotary or rocker type wireless switch. The potential energy source represented by the magnet 131 is at the center of the device and thus all magnetic leaks are recovered by the ferromagnetic parts 161, 132, 133, 162, 122, 121 and contribute to the generation of energy.

In the second embodiment represented in FIGS. 8 to 12, the first main part 211 is static and thus constitutes the stator and the second main part 212 is mobile and thus constitutes the rotor. In contrast to the first embodiment, the rotor 212 is disposed around the stator 211. The stator 211 and the rotor 212 are mounted coaxially about a main axis represented by the fixed shaft 201 of the stator.

As can be seen in FIGS. 8, 9, 10 and 11, the stator 211 includes a ferromagnetic material intermediate part 213 that is essentially formed by the main shaft 201. This intermediate part 213 has a cylindrical portion having symmetry of revolution relative to the fixed shaft 201. The stator 211 also includes an energization coil 214 mounted on a coil support 203. The stator 211 includes ferromagnetic material fingers 221, 222 fastened to the intermediate part 213. The downwardly oriented fingers 221 are fastened to an annular part 261 that is itself fastened to the circumference near the upper edge 226 of the intermediate part 213. The upwardly oriented fingers 222 are fastened to an annular part 262 that is itself fastened to the circumference near the lower edge 227 of the intermediate part 213. The fingers 221, 222 are arranged along the circumference of the annular parts 261, 262, respectively, so that they interlace over a portion of the energization coil 214. To be more precise, the fingers 221, 222 are arranged along the circumference of the annular parts 261, 262 and disposed alternately on one and the other of the annular parts with a constant finger pitch. These fingers 221, 222 are also alternately oriented in opposite axial directions. Thus the fingers 221 arranged along the circumference of the annular part 261 are downwardly oriented and the fingers 222 arranged along the circumference of the annular part 262 are upwardly oriented. The fingers 221, 222 are L-shaped. A first air gap surface 225 of the stator 211 having a substantially cylindrical shape is formed by the external axial flank 204, 205 of the fingers 221, 222.

Figure 8:
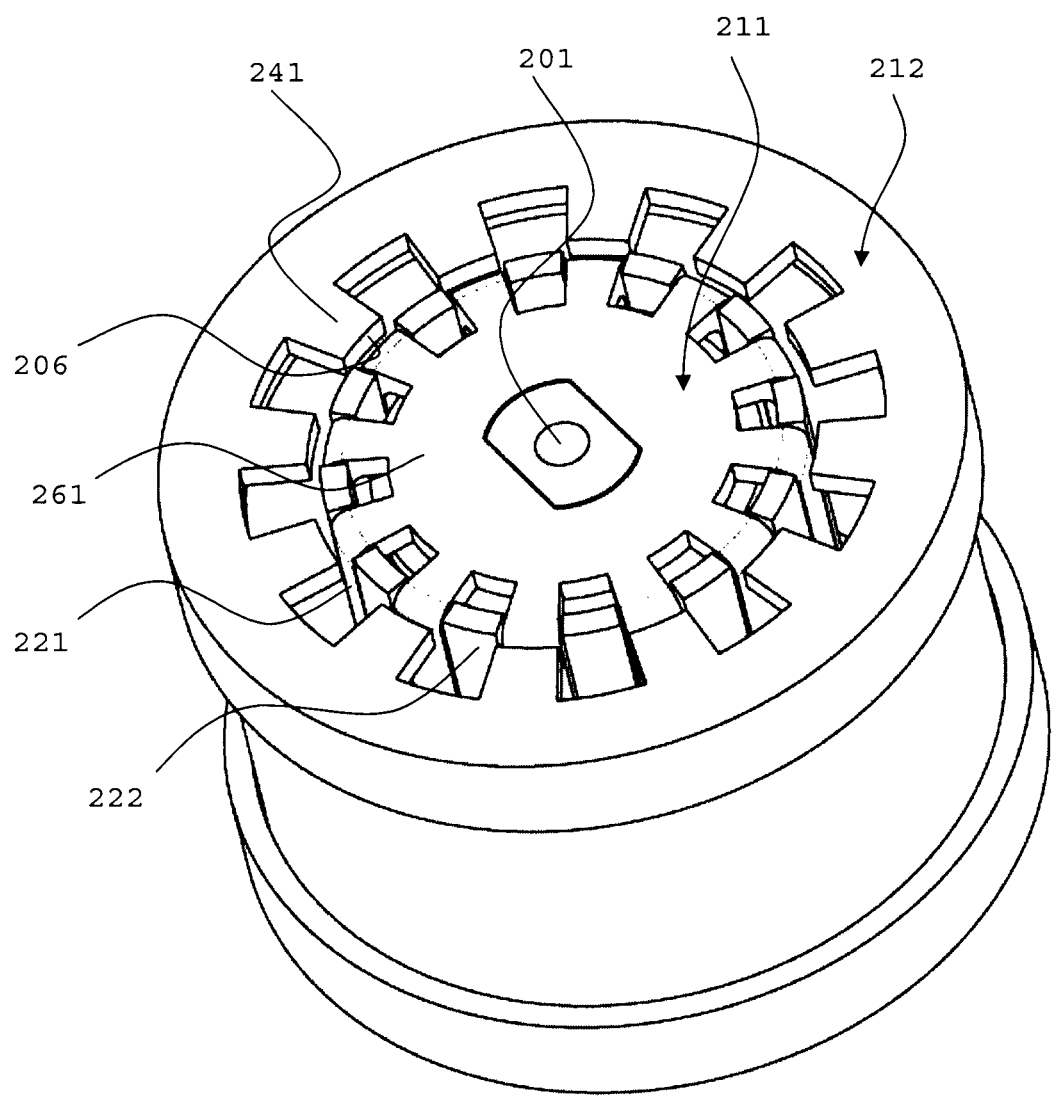
FIG. 8 is a perspective view of a rotary machine of a second embodiment of the invention.
Figure 9:
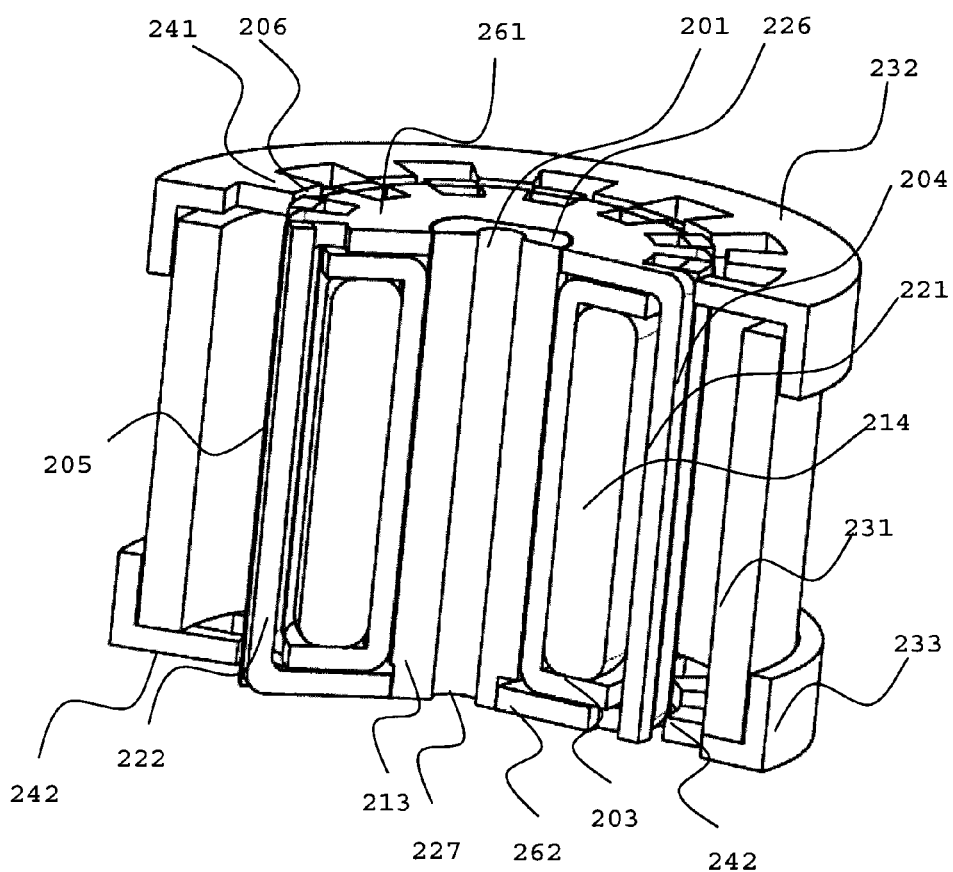
FIG. 9 is a partial perspective view of the embodiment represented in FIG. 8.
Figure 10:
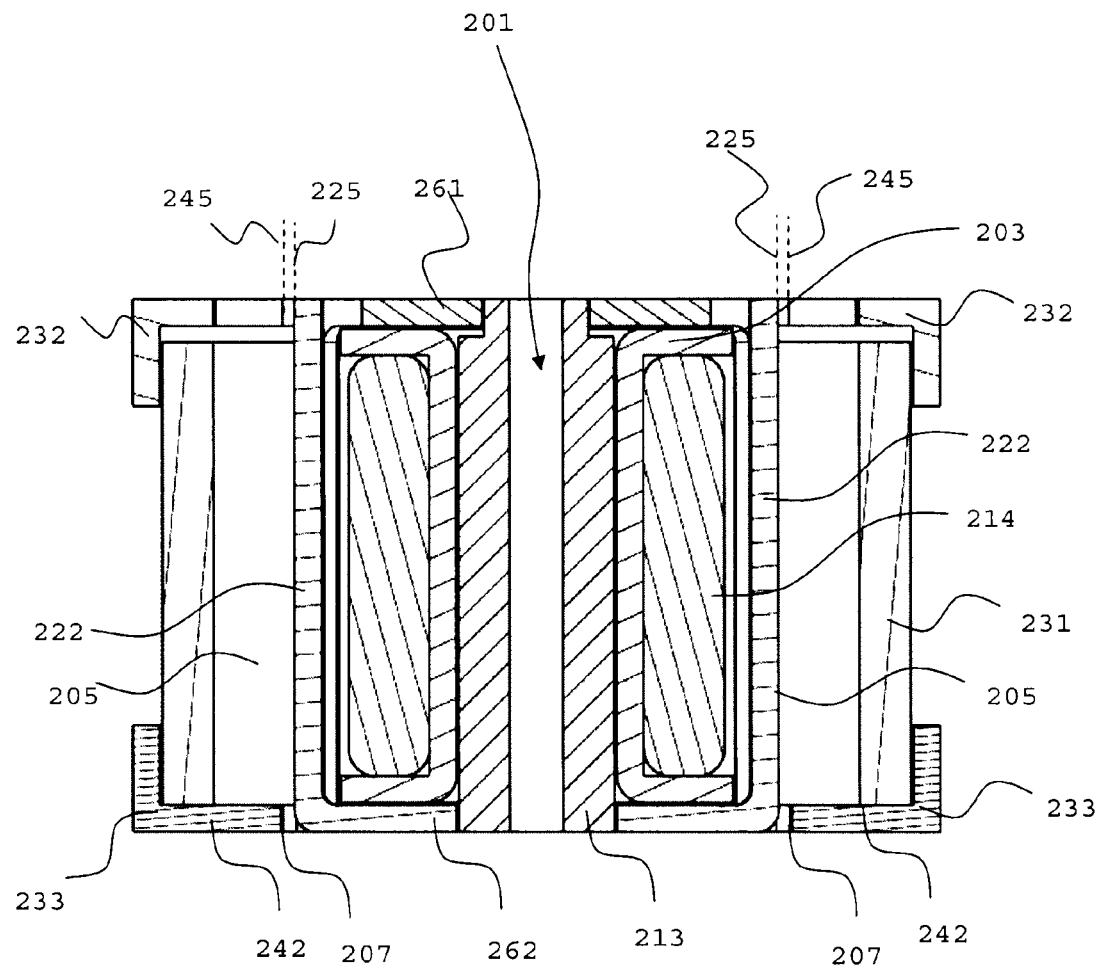
FIG. 10 is a view in section of the embodiment represented in FIG. 8.
Figure 11:
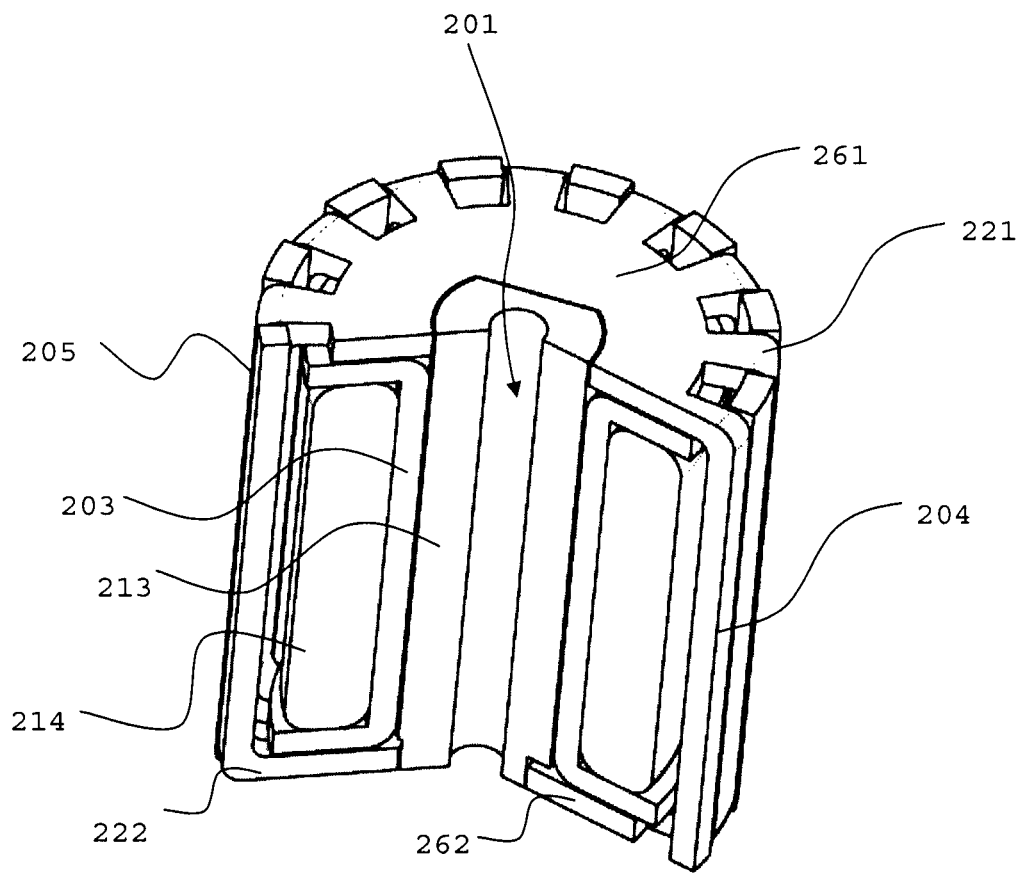
FIG. 11 is a partial perspective view of the stator of the embodiment represented in FIG. 8.

The rotor 212 that can be seen in FIGS. 8, 9 and 10 includes a unidirectionally polarized permanent magnet 231, an upper lateral part 232 and a lower lateral part 233 mounted substantially coaxially relative to the fixed shaft 201. The permanent magnet 231 has symmetry of revolution relative to the fixed shaft. To be more precise, the permanent magnet 231 is of cylindrical shape and is magnetized in an axial direction. The two lateral parts 232, 233 are made from a ferromagnetic material and are fastened to the magnet so as to have polarities of opposite sign. To be more precise, the two lateral parts 232, 233 are fastened to the edges of the magnet. The lateral parts 232, 233 also have symmetry of revolution relative to the main shaft 201. The protruberances or teeth 241, 242 are disposed along the interior circumference of the lateral parts and disposed alternately on one and the other of said lateral parts with a protruberance pitch substantially identical to the finger pitch. The end faces 206, 207 of the protruberances 241, 242 form a second cylindrical air gap surface 245. The end faces 206, 207 of the protruberances 241, 242 and the faces of the external axial flanks 204, 205 of the fingers 221, 222 forming the air gap surfaces 225, 245 can be plane. They can advantageously be slightly curved with a curvature along the circumference of the stator and the rotor in order to minimize variation of the air gap distance.

Figure 12:
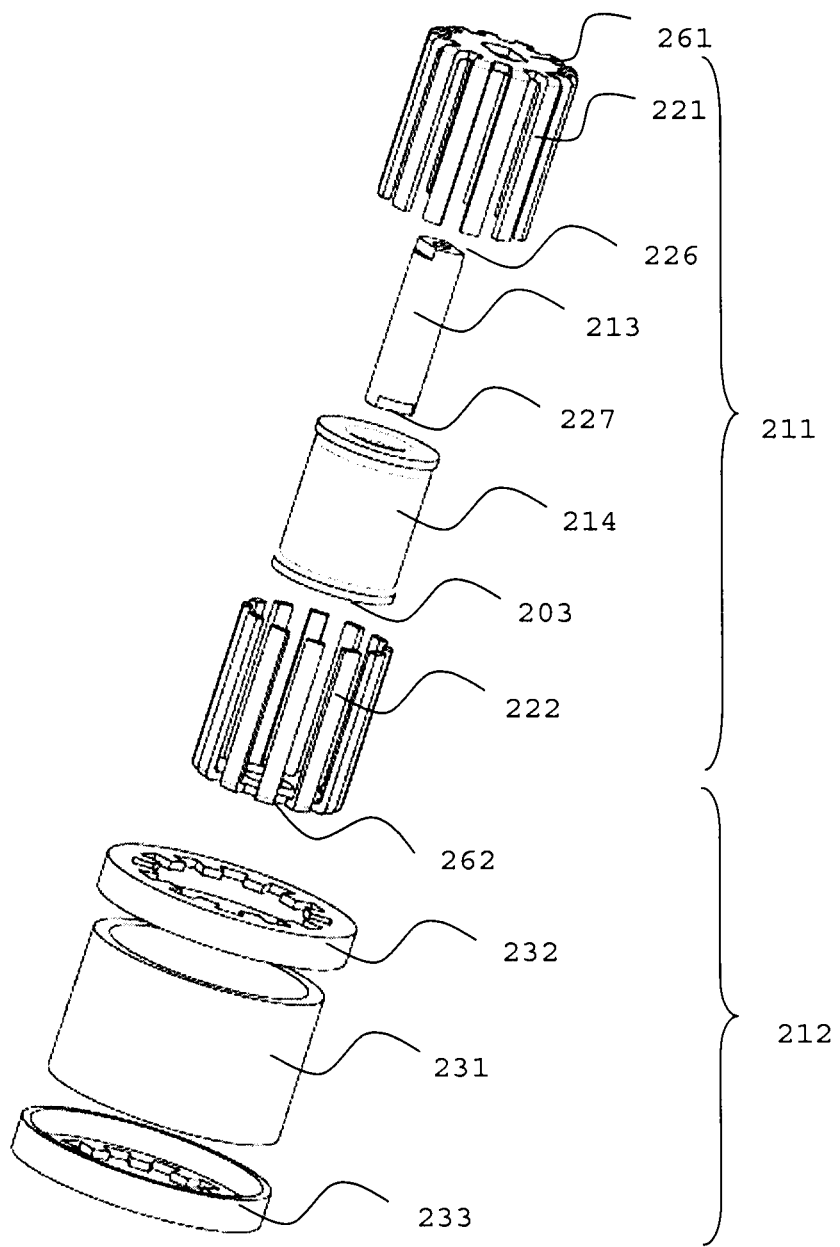
FIG. 12 is an exploded view showing the assembly of the embodiment represented in FIG. 8.
Figure 13:
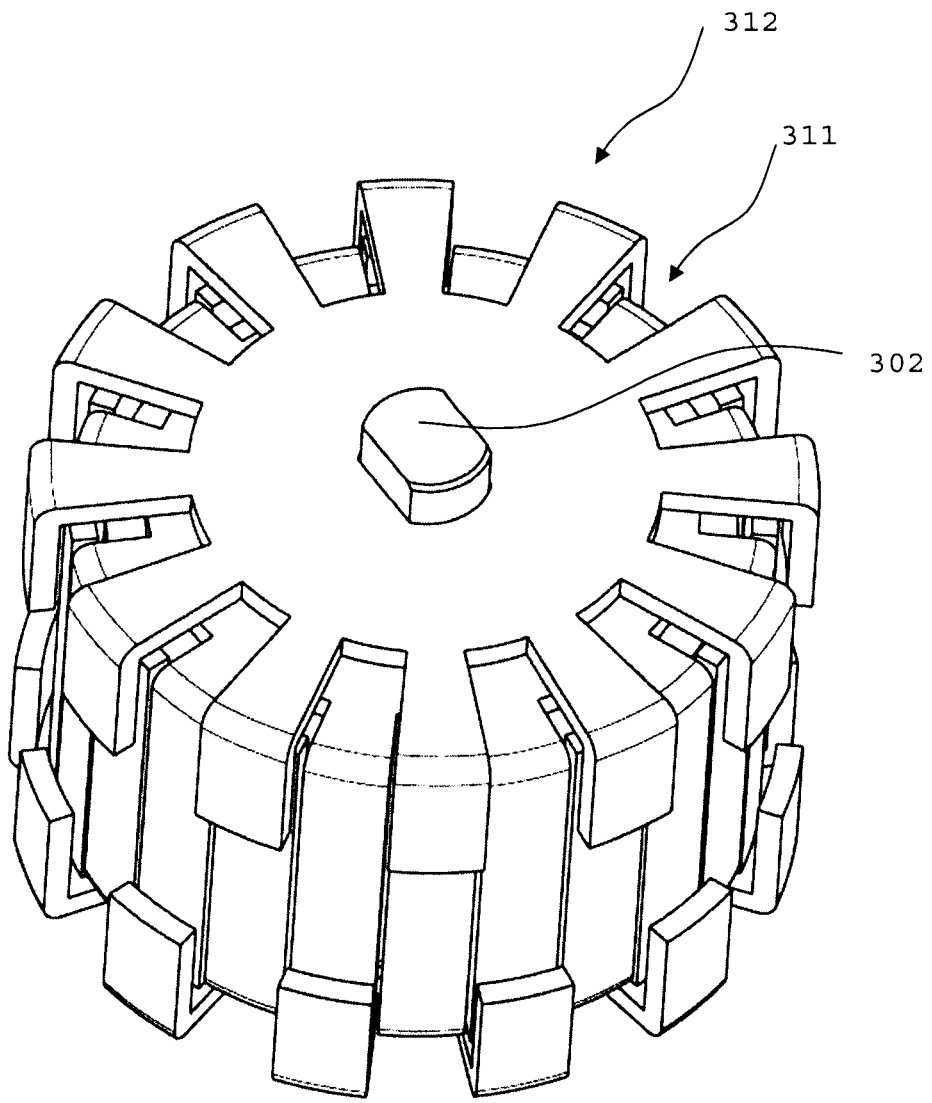
FIG. 13 is a perspective view of a rotary machine of a third embodiment of the invention.
Figure 14:
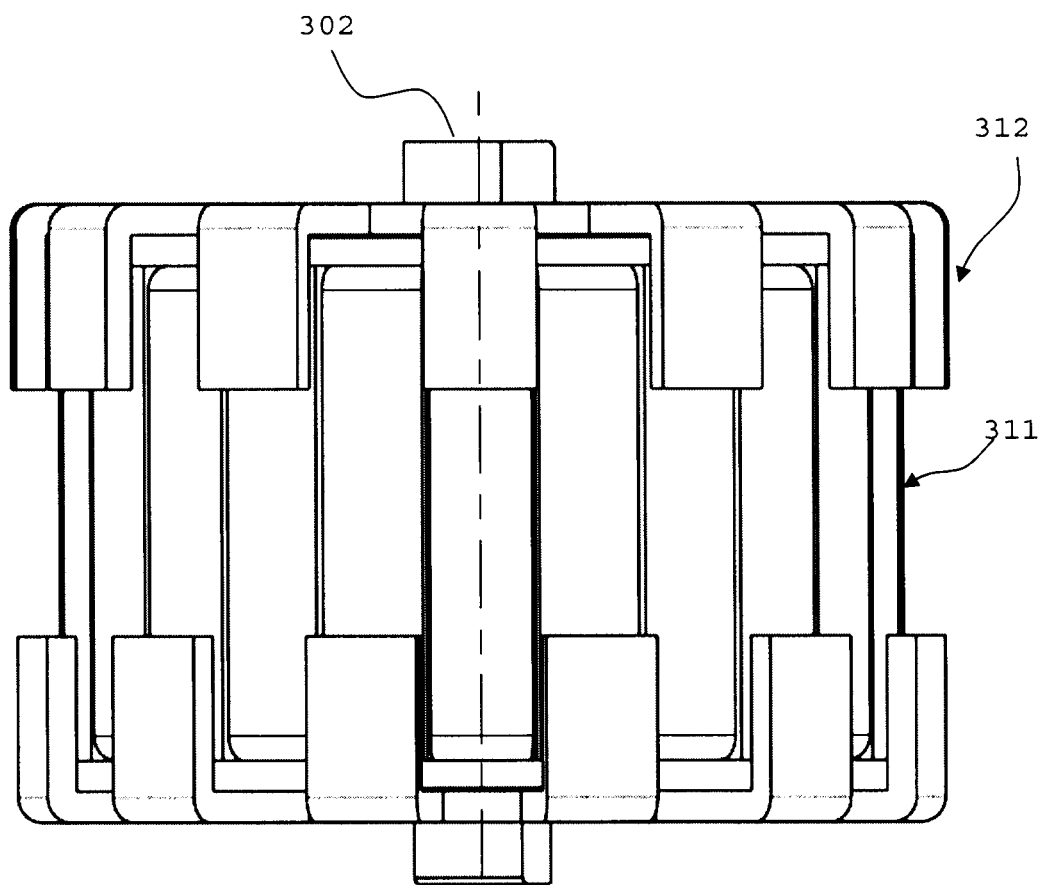
FIG. 14 is a side view of the embodiment represented in FIG. 13.

As can seen in FIG. 12, the intermediate part 213 of the stator 211 has a cylindrical portion. The downwardly oriented fingers 221 are fastened to the annular part 261 and the upwardly oriented fingers 222 are fastened to the other annular part 262. When assembling a rotary machine of the second embodiment, the annular finger support parts 261, 262 come to bear on shoulders at the ends of the cylindrical portion of the intermediate part 213. This type of arrangement in which the fingers oriented in the same direction are disposed on the same annular part facilitates assembly of the rotary machine. In contrast to the first embodiment, the fingers 221, 222 fastened to the same annular part 261, 262 are outside the cylindrical portion of the intermediate part 213. When assembling the rotary machine, the energization coil 214 and the coil support 203 are threaded over the intermediate part 213 and disposed between the fingers 221, 222 and said intermediate part 213. This first stage of assembly forms the stator 211. The components of the rotor 212, i.e. the magnet 231 and the lateral portions 232, 233 are assembled and mounted coaxially around the stator 211.

The device of this second embodiment is totally reversible and may be used as a motor, such as windshield wiper motor, or as an energy generator for an autonomous device, such as a wireless rotary or rocker switch. The potential source of energy represented by the magnet 214 is at the periphery of the device and so the rotation speeds necessary for the generation of energy are lower. The device may therefore be coupled with a lower speed system than the device of the first embodiment. In this embodiment with a magnet at the perimeter, the magnet volume is greater than in the first embodiment and this increases the potential energy.

In the third embodiment represented in FIGS. 13 to 18, the first main part 311 is static and thus constitutes the stator and the second main part 312 is mobile and thus constitutes the rotor. As in the second embodiment, the rotor 312 and its air gap surface are disposed around the stator 311. However, as in the first embodiment, the rotor 312 includes a drive shaft 302 disposed inside the stator 311. The stator 311 and the rotor 312 are therefore mounted coaxially around this drive shaft 302.

Figure 15:
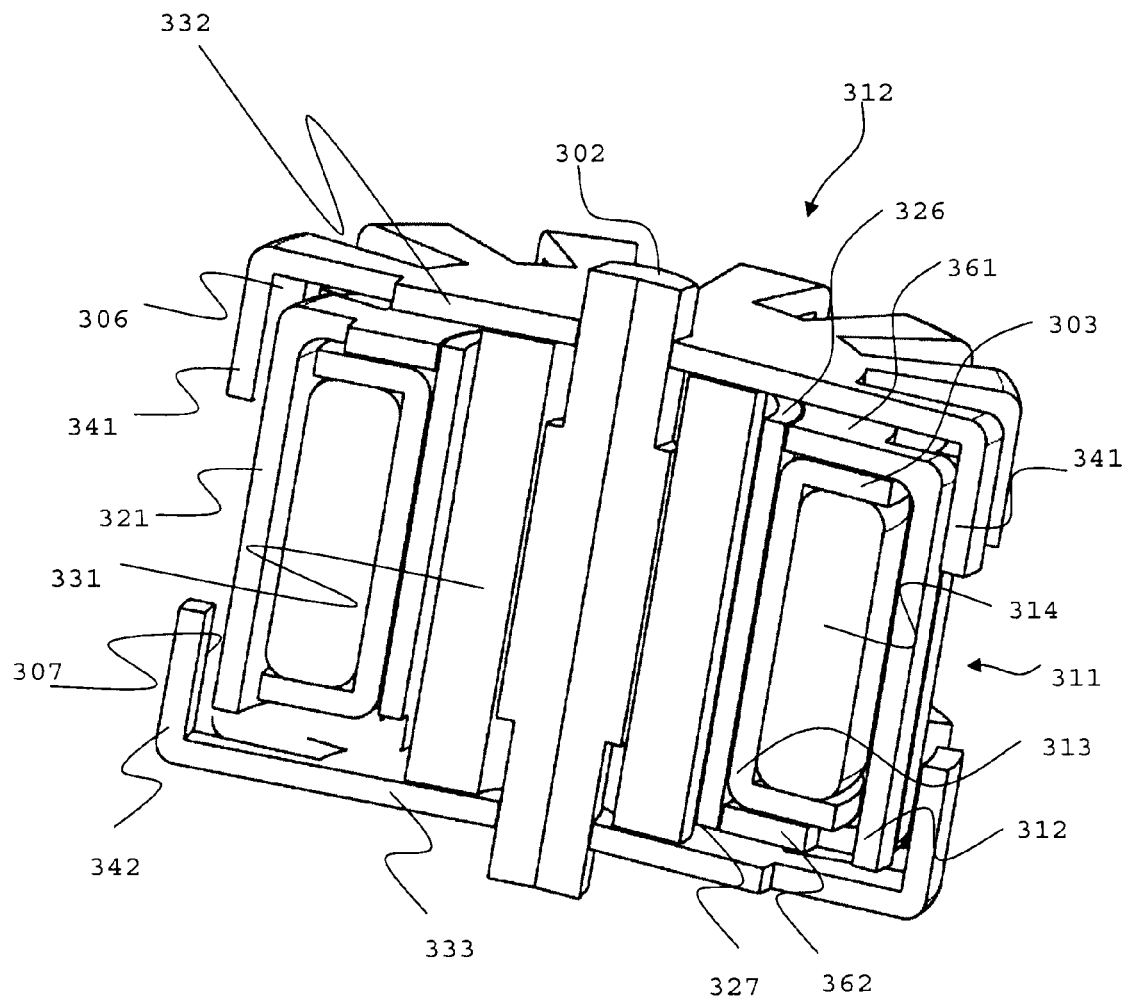
FIG. 15 is a partial perspective view of the embodiment represented in FIG. 13.
Figure 16:
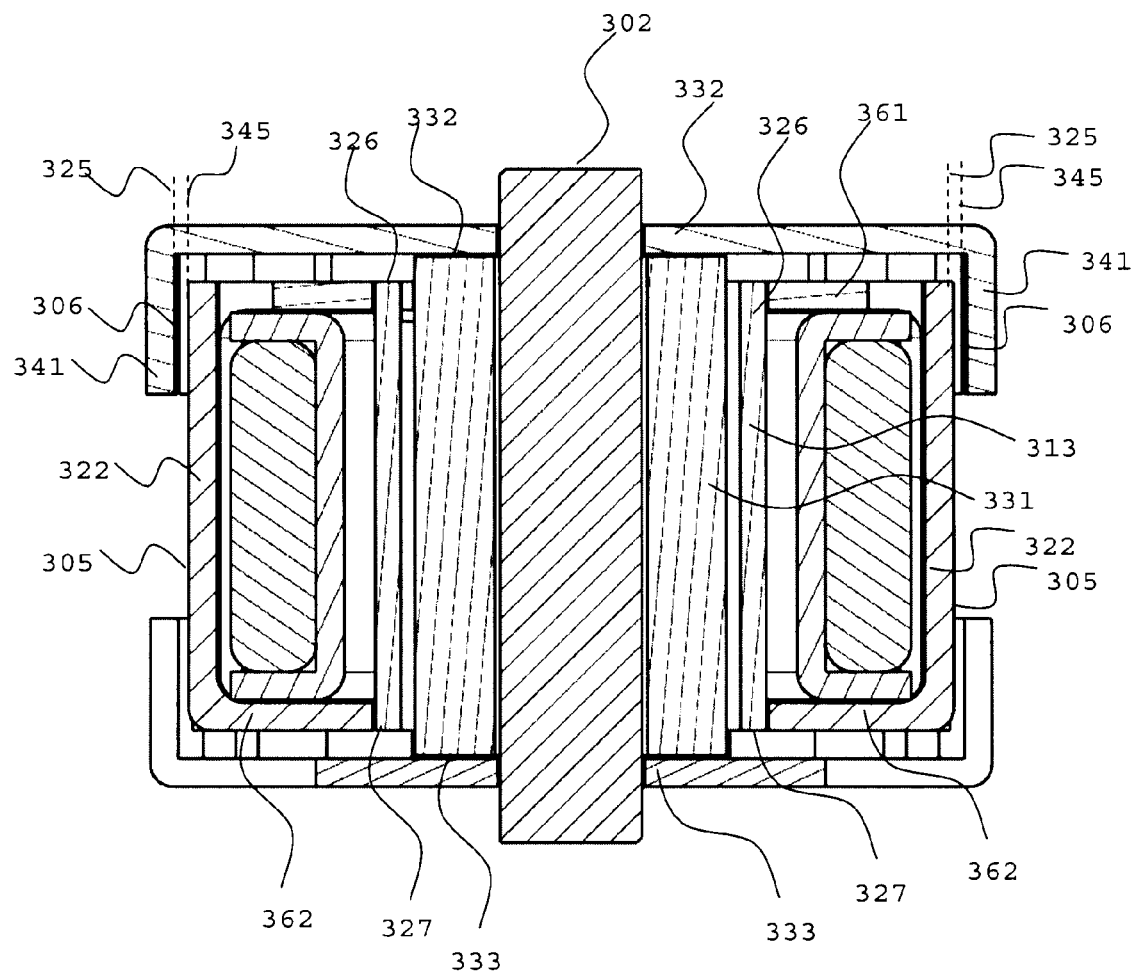
FIG. 16 is a view in section of the embodiment represented in FIG. 13.
Figure 17:
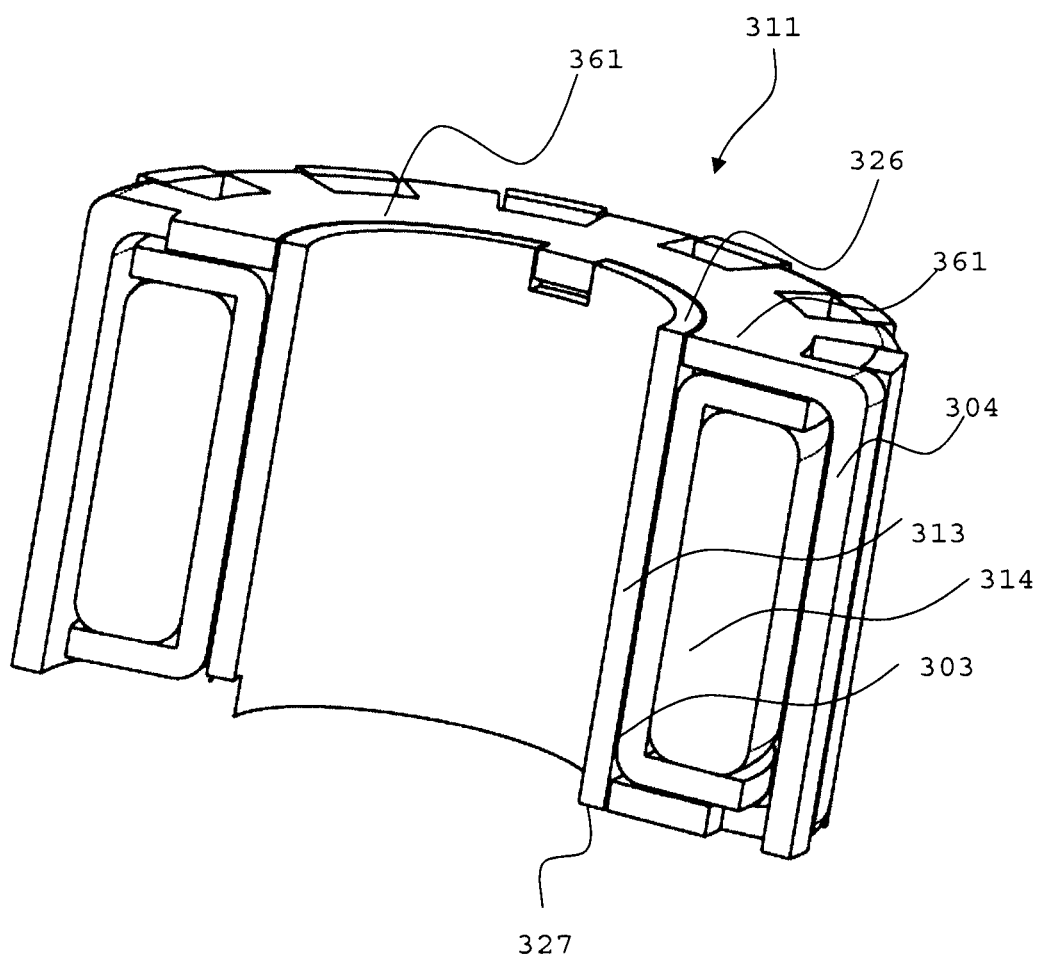
FIG. 17 is a partial perspective view of the stator of the embodiment represented in FIG. 13.

As may be seen in FIGS. 15 to 17, the stator 311 includes a ferromagnetic material intermediate part 313 in the form of a hollow cylinder. The stator 311 also includes an energization coil 314 mounted on a coil support 303. The stator 311 further includes ferromagnetic material fingers 321, 322 fastened to the intermediate part 313. To be more precise, the downwardly oriented fingers 321 are fastened to an annular part 361 that is itself mounted on the circumference near the upper edge 326 of the intermediate part 313. For their part, the upwardly oriented fingers 322 are fastened to an annular part 362 that is itself mounted on the circumference near the lower edge 327 of the intermediate part 313. The fingers 321, 322 are arranged along the circumference of the annular parts 361, 362, respectively, so that they interlace over a portion of the energization coil 314. To be more precise, the fingers 321, 322 are arranged along the circumference of the annular parts and disposed alternately on one and the other of said annular parts 361, 362 with a constant finger pitch. The fingers 321, 322 are also alternately oriented in opposite axial directions. Thus the fingers 321 arranged along the circumference of the annular part 361 are downwardly oriented and the fingers 322 distributed along the circumference of the annular part 362 are upwardly oriented. The fingers 321, 322 are L-shaped. A first air gap surface 325 of the stator 311 of substantially cylindrical shape is formed by the external axial flank 304, 305 of the fingers 321, 322.

The rotor 312 that can be seen in FIGS. 13, 14, 15 and 16 includes a unidirectionally polarized permanent magnet 331 and an upper lateral part 332 and a lower lateral part 333 mounted substantially coaxially relative to the drive shaft 302. The permanent magnet 331 has symmetry of revolution relative to the drive shaft 302. To be more precise, the permanent magnet 331 is of cylindrical shape and has two faces 334, 335 with magnetizations of opposite sign and constituting the poles of said magnet. The two lateral parts 332, 333 are made from a ferromagnetic material and are fastened to each of the faces 332, 333 of the magnet. They therefore have polarities having opposite signs. The lateral parts 332, 333 also have symmetry of revolution relative to the drive shaft 302. The protruberances 341, 342 are arranged along the circumference of the lateral parts and disposed alternately on one and the other of said lateral parts with a protruberance pitch substantially identical to the finger pitch. The protruberances 341, 342 are L-shaped with the end branches oriented axially. The interior flanks 306, 307 of the end branches of the protruberances 341, 342 form a second cylindrical air gap surface 345. The faces of the interior flanks 306, 307 of the end branches of the protruberances 341, 342 and the faces of the external axial flanks 204, 205 of the fingers 321, 322 forming the air gap surfaces 325, 345 can be plane. They can advantageously be slightly curved with a curvature along the circumference in order to minimize variation of the air gap distance along the circumference of the stator and the rotor.

Figure 18:
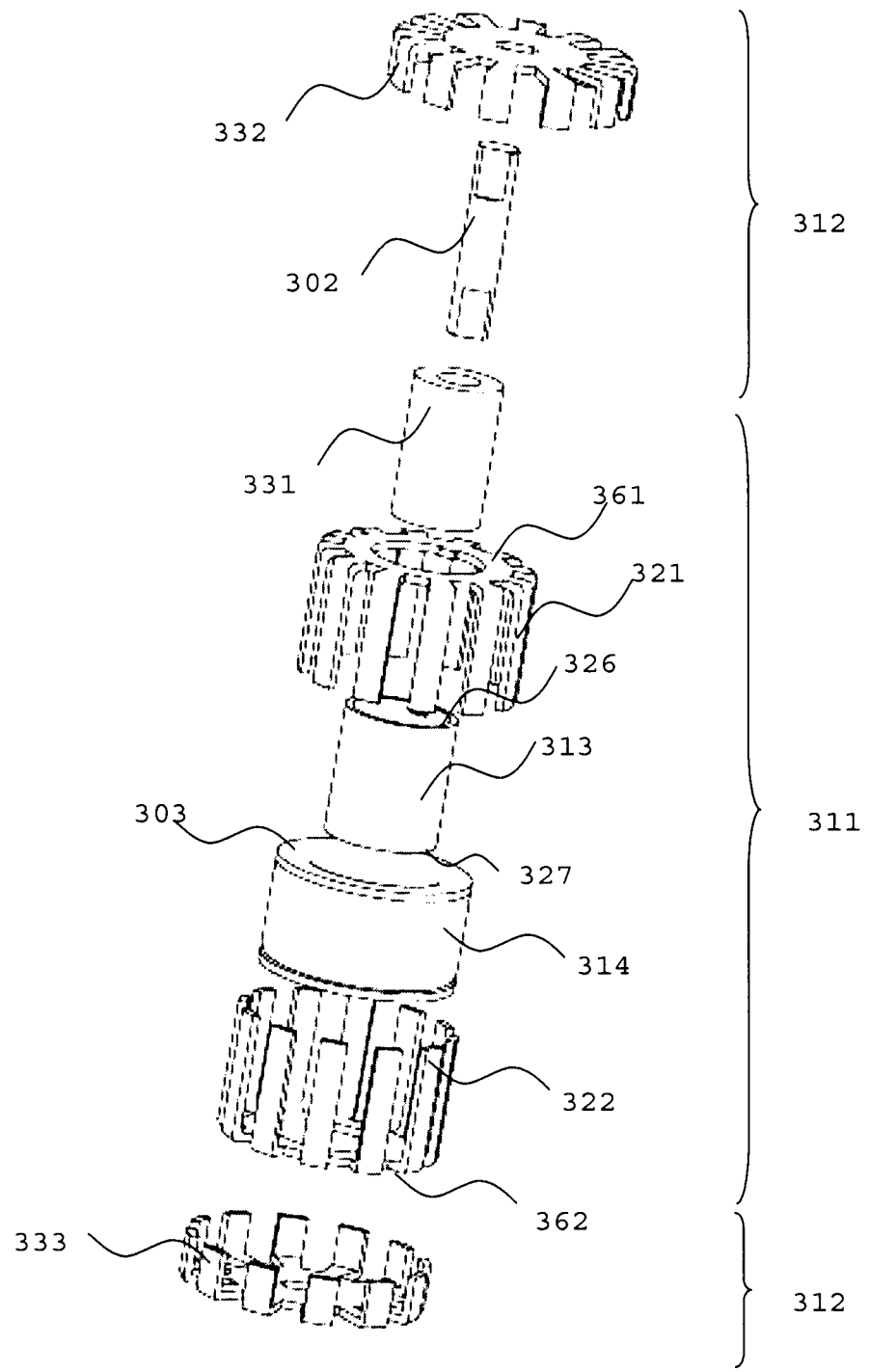
FIG. 18 is an exploded view showing the assembly of the embodiment represented in FIG. 13.

As can be seen in FIG. 18, the intermediate part 313 of the stator 311 has a cylindrical portion. The downwardly oriented fingers 321 are fastened to the annular part 361 and the upwardly oriented fingers 322 are fastened to the other annular part 362. When assembling a rotary machine according to the third embodiment, the annular finger support parts 361, 362 come to bear on the edges 326, 327 of the cylindrical portion of the intermediate part 313. This type of arrangement in which the fingers oriented in the same direction are disposed on the same annular part facilitates assembly of the rotary machine. As in the second embodiment, the fingers 321, 322 fastened to the same annular part 361, 362 are outside the cylindrical portion of the intermediate part 313. When assembling the rotary machine, the energization coil 314 and the coil support 303 are therefore threaded over the intermediate part 313 and disposed between the fingers 321, 322 and the intermediate part 313. This first stage of assembly forms the stator 311. The components of the rotor 312, i.e. the magnet 331, the lateral portions 332, 333 and the drive shaft 302, are assembled and inserted coaxially into the stators 311.

The device of this third embodiment has the advantages of the first two embodiments. It is compact, efficient and totally reversible. It may be used as a motor, for example a windshield wiper motor, or as an energy generator for an autonomous device, for example a wireless rotary or rocker switch. The potential energy source represented by the magnet 331 is at the center of the device and so all magnetic leaks are recovered by the ferromagnetic parts 332, 361, 362, 333 and contribute to the generation of energy. The teeth of the rotor are at the periphery of the device and so the rotation speeds necessary to generate energy are lower. Thus the device may be coupled to a system operating at a lower speed than the device of the first embodiment.

As described above, the rotary machine of the invention may therefore be a motor or a generator. It is particularly suited to operation as a generator.

The rotary machine of the invention allows to reverse the magnetic flux on each rotation corresponding to one pole pitch, i.e. one finger pitch or one protuberance pitch. When the rotary machine is used as a generator, this reversal of the magnetic flux on each pole pitch optimizes the variations of the flux over time and thus maximizes the electrical energy produced.

The rotary machine of the invention also facilitates the fabrication of the permanent magnetization portion compared to prior art rotary machines in which the permanent magnetization portion includes a succession of permanent magnets having polarities of opposite sign, which have an inherent tendency to repel each other. This advantage is all the more important given that the part to be produced is of small size.

The rotary machine of the invention is particularly suited to generation of energy by rotation of the rotor relative to the stator over a partial revolution. In this mode of operation it is possible to generate from 500 to 600 micro joules of electrical energy for a one-pole pitch rotation of the rotor.

Using a unidirectionally polarized magnet, i.e. a magnet having two poles on two opposite faces, makes the rotary machine of the invention suitable for installations of small size. The invention is in particular suited to construction of energy generators for any control device, such as a switch.

Figure 19:
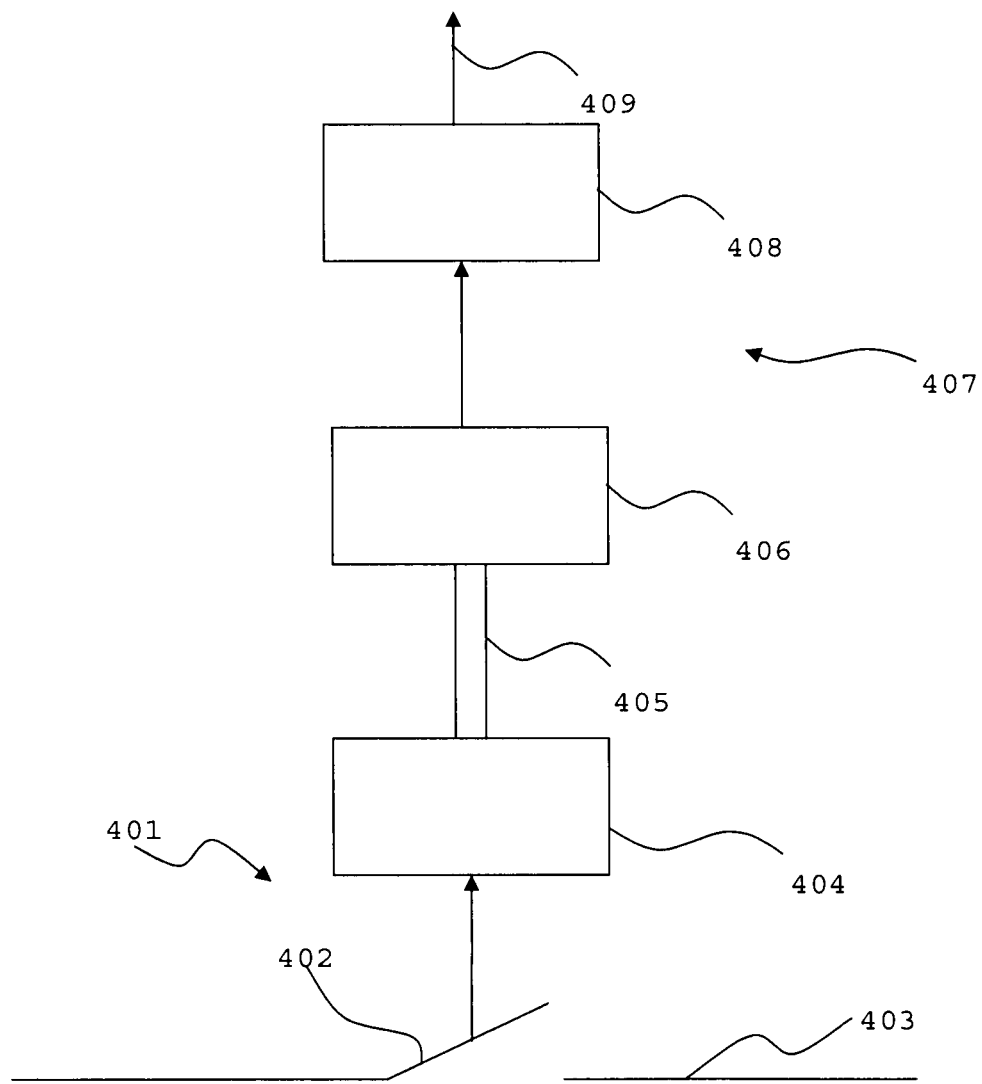
FIG. 19 represents diagrammatically a switch including a rotary machine of the invention.

Referring to FIG. 19, one such switch 401 includes a control member 402 operating on contact means to make or break the flow of an electric current in a conductor 403. Such a switch also includes mechanical coupling means 404 for transforming rocking movement of the control member into rotation movement of a drive shaft 405. This shaft is coupled to the rotor 406 of a voltage generator 407 of any of the embodiments described above. For its part, the stator 408 of this generator is fastened to the frame of the switch and has an electrical output 409.

The invention claimed is:

1. A transverse flux rotary machine comprising:
   first and second main parts mounted substantially coaxially about a main shaft, the main parts including a stator and a rotor rotatably mounted relative to the stator,
   the first main part comprising at least one energization coil, an intermediate part that is magnetically permeable, and fingers arranged along the circumference of the intermediate part at a constant finger pitch and alternately oriented in opposite directions, the fingers forming a first air gap surface, the fingers being disposed to form with the intermediate part a plurality of magnetic circuits around a portion of the coil,
   the second main part comprising a second air gap surface for closing the magnetic circuits formed in the first main part by intervention of the first air gap surface, and a permanent magnetization portion that is unidirectionally polarized,
   wherein the fingers are disposed to interlace, the second main part including protuberances carrying the second air gap surface, the protuberances being fastened to the permanent magnetization portion so as to have opposite polarities, the opposite polarity protuberances being alternately arranged along the circumference of the second main part with a protuberance pitch substantially identical to the finger pitch and
   wherein the second main part includes two magnetically permeable lateral parts mounted substantially coaxially relative to the main shaft, the lateral parts being disposed so as to oppose axial end faces of the permanent magnetization part so as to have opposite polarities, the protuberances of same polarity being disposed on one or the other of the lateral parts and arranged along the circumference of the lateral parts.

2. A rotary machine according to claim 1, wherein the first main part is a stator and the second main part is a rotor.

3. A rotary machine according to claim 1, wherein the intermediate part includes a cylindrical portion.

4. A rotary machine according to claim 3, wherein the fingers oriented in a given direction are fastened to an annular part disposed on an edge of the cylindrical portion of the intermediate part.

5. A rotary machine according to claim 4, wherein the fingers fastened to a same annular part are inside the cylindrical part.

6. A rotary machine according to claim 4, wherein the fingers fastened to a same annular part are outside the cylindrical portion.

7. A rotary machine according to claim 1, wherein the permanent magnetization part is in one piece.

8. A rotary machine according to claim 7, wherein the permanent magnetization part is cylindrical.

9. A rotary machine according to claim 1, wherein the lateral parts are annular parts disposed on the circumference or on edges of the permanent magnetization portion.

10. A rotary machine according to claim 1, wherein the protuberances are teeth including end faces that form the second air gap surface.

11. A rotary machine according to claim 1, wherein the protuberances are L-shaped with the end branches oriented axially.

12. A rotary machine according to claim 1, wherein the first main part is disposed around the second main part.

13. A rotating machine according to claim 1, wherein the second main part is disposed around the first main part.

14. A switching device comprising:
   a control member; and
   a rotary machine used as an energy generator, the rotary machine including a rotor, wherein the rotary machine is a machine according to claim 1, the rotor being mechanically coupled to the control member.

15. A rotary machine according to claim 3, wherein the fingers oriented in a given direction are fastened to an annular part disposed on an axial edge of the cylindrical portion of the intermediate part.

16. A rotary machine according to claim 15, wherein the fingers fastened to a same annular part are inside the cylindrical part.

17. A rotary machine according to claim 15, wherein the fingers fastened to a same annular part are outside the cylindrical portion.

18. A rotary machine according to claim 1, wherein an axial length of at least one of the fingers is greater than an axial length of the at least one energization coil.

19. A rotary machine according to claim 1, wherein an axial length of at least one of the fingers is greater than an axial length of at least one of the protuberances.

* * * * *